Aug. 29, 1961     G. V. WOODLING     2,998,502
MOISTURE CONTROL FOR ELECTRIC BLANKETS
Filed Nov. 5, 1958

*INVENTOR.*
GEORGE V. WOODLING
*BY*
Woodling and Krost
ATTORNEYS

United States Patent Office 2,998,502
Patented Aug. 29, 1961

2,998,502
MOISTURE CONTROL FOR ELECTRIC BLANKETS
George V. Woodling, 1386 Union Commerce Bldg., Cleveland, Ohio
Filed Nov. 5, 1958, Ser. No. 772,085
5 Claims. (Cl. 219—20)

The present invention relates to moisture control devices and more particularly to moisture control devices adapted to control electric blankets.

In this application, the term electric blankets includes electric pads and electric sheets, as well as electric blankets.

An object of this invention is to control the heating of electric blankets in accordance with the moisture entrapped under the blankets, the moisture entrapped under the blanket being generated by the perspiration of the body.

Another object of the invention is to control the heating of an electric blanket by temperature control means and by moisture control means, the moisture control means being governed by moisture circuit means, whereby the proper degree of comfort is maintained at all times.

Another object of the invention is to control the heating of an electric blanket in accordance with the comfort of the body.

Figure 1:
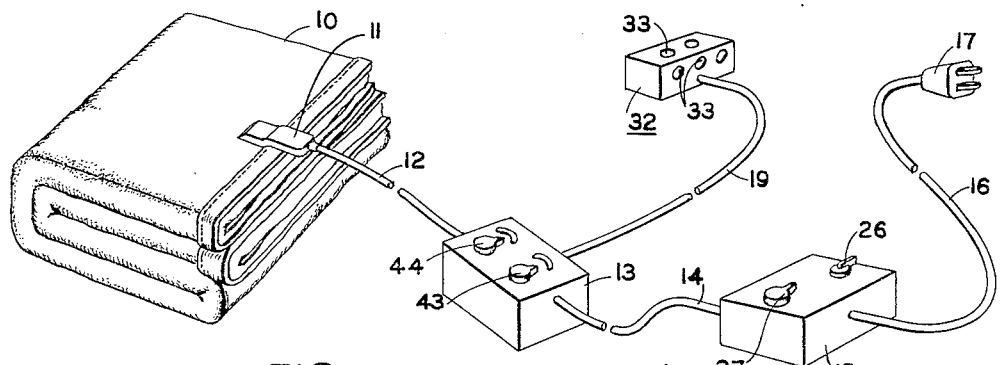
Figure 2:
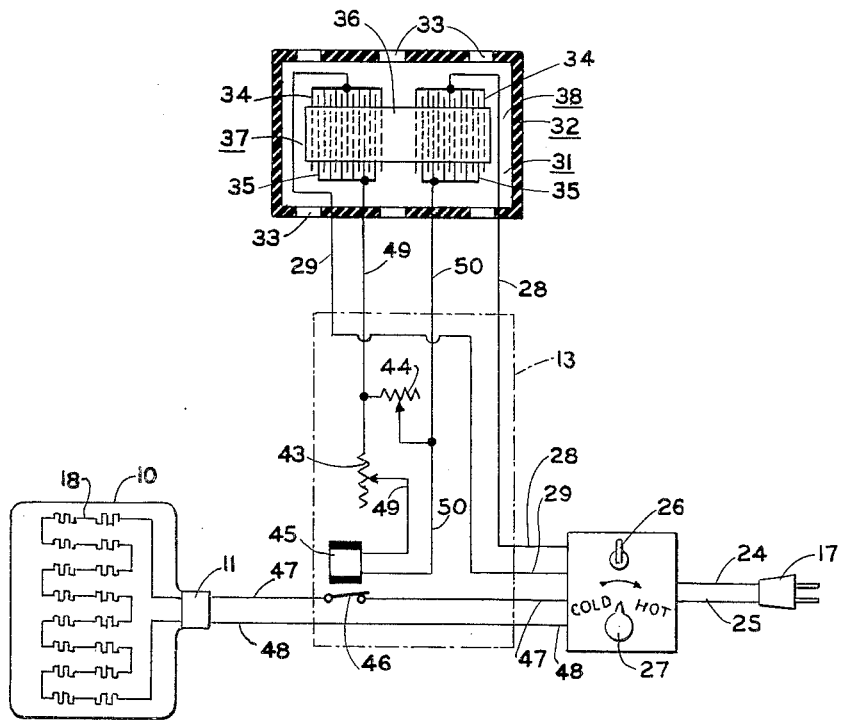

Other objects and a fuller understanding of the invention may had by referring to the following description and claims taken in conjunction with the accompanying drawing in which:

FIGURE 1 illustrates an electric blanket having attached thereto moisture control means and temperature control means for regulating the heating of the blanket; and FIGURE 2 is a diagrammatic illustration of a moisture control circuit embodying the features of the invention.

With reference to FIGURE 1, the invention comprises a blanket 10, a moisture control box 13, a temperature control box 15 and a moisture sensing box 32. The blanket 10 has a heating element 18 and is adapted to be energized by a detachable plug 17 which may be plugged into any suitable electric light source. An electric cord 16 supplies voltage to the temperature control box 15, which has mounted therein temperature control means which may be of any suitable type now available on the market. Extending between the temperature control box 15 and the moisture control box 13 is an electric cord 14, and extending from the moisture control box 13 is an electric cord 12 having on the end thereof a detachable plug 11 for connection with the electric blanket. Extending between the moisture control box 13 and the moisture sensing box 32 is an electric cord 19. The electric cord 19 may be of any suitable length and is of such length that the moisture sensing box 32 may be placed in bed in the vicinity of the person sleeping in the bed so that the moisture sensing box 32 is exposed to moisture generated by the body. When the moisture generated by the body becomes excessive, it mans that the person is too warm and the blanket is de-energized under this condition. When the moisture in the vicinity of the person under the blanket is deficient, it means that the person is not warm enough and under this condition, the electric heating blanket is energized. The person may place the moisture sensing box 32 near his feet so that the electric blanket remains energized so long as the feet remain cold.

Mounted in the moisture sensing box 32 is moisture circuit means 31, see FIGURE 2. The moisture circuit means 31 is completely enclosed within the moisture sensing box 32, except for ventilating openings 33. The moisture sensing box 32 is preferably made of insulating material and is shown in section in FIGURE 2 but in actual practice, the moisture sensing box 32 is a complete enclosure. Mounted on the bottom of the moisture sensing box 32 is a plurality of spaced conductors 34 and 35. The spaced conductors 34 and 35 may be provided on the bottom of the moisture sensing box in any suitable manner and for the present invention, a printed circuit appears to be satisfactory. Extending across the top of the spaced conductors 34 and 35 is a current conductor coating 36 which becomes conductive under moisture conditions. When the air within the moisture sensing box 32 is dry, substantially no current flows between the spaced conductors 34 and 35 but when the air in the moisture sensing box 32 becomes damp, current flows between the spaced conductors 34 and 35. The moisture circuit means 31 may be substantially the same as that disclosed in my applications Serial Numbers 727,490 filed April 9, 1958, 749,854 filed July 21, 1958, and 763,885 filed September 29, 1958, of which this application is a continuation-in-part and the disclosures in my applications, Serial Numbers 727,490, 749,854 and 763,885 are hereby incorporated in this application.

The spaced conductors 34 and 35 are preferably arranged in two parts which may be referred to as the left-hand part 37 and the right-hand part 38 as shown in FIGURE 2 of the drawing. The moisture circuit means 31 is adapted to control a relay 45 which in turn operates a contact 46 for governing the heating element 18 of the electric blanket 10. Mounted in the electric cord 16 are two supply conductors 24 and 25 which supply current to the temperature control box 16 which has a switch 26 for turning the circuit on and off. The temperature control box 15 has a temperature control knob 27 which may be turned for adjusting the temperature at which the electric blanket is energized. Extending from the temperature control box 15 are two conductors 28 and 29 which are directly connected in the control box 15 to the two supply conductors 24 and 25, respectively. In other words, the conductors 28 and 29 supply voltage directly to the moisture circuit means from the electric supply socket. The conductor 28 is electrically connected to the spaced conductors 34 on the right-hand part 38 and the electric conductor 29 is electrically connected to the spaced conductors 34 on the left-hand part 37. The relay 45 is energized by two conductors 49 and 50 which are respectively connected to the left-hand part 37 and the right-hand part 38 of the spaced conductors 35. The conductors 29 and 28, and conductors 49 and 50 are enclosed in cord 19. A series resistor 43 is connected in series with the conductor 49 for adjusting the voltage at which the relay operates, and a parallel resistor 44 is connected across the conductors 49 and 50 to also adjust the voltage at which the relay 45 operates. Extending from the temperature control box 15 to the moisture control box 13 are two conductors 47 and 48. The conductors 47 and 48, and the conductors 28 and 29 are mounted inside of the cord 14. The conductors 47 and 48 extend from the moisture control box 13 and are mounted inside of the cord 12. The relay contact 46 is arranged to interrupt the flow of current in the conductor 47.

In operation, the temperature control box 15 may have its knob 27 adjusted at any selected temperature. Also the resistors 43 and 44 may be adjusted by knobs on the moisture control box 13. So long as the body is insufficiently heated, the air surrounding the body under the blanket will be relatively dry, in which event, very little, if any, current will flow between the spaced conductors 34 and 35, with the result that the relay 45 is de-energized which closes the contact 46 for supplying current to the heating elements 18 of the electric blanket. The blanket continues to be energized until the body begins to generate moisture which will cause current to flow between the spaced conductors 34 and 35 and when the moisture reaches a predetermined value, the relay contact 46 opens for de-energizing the heating element 18 of the electric blanket. Accordingly, the present invention controls the energization of the electric blanket in accordance with the body comfort. That is to say, when the person's body begins to perspire, it means that the electric blanket is de-energized.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A control for an electric blanket having heating winding means, moisture-responsive means positionable to be influenced by moisture entrapped under the blanket, current supply circuit means for energizing said heating winding means, control means interconnecting said current supply means and said heating winding means to control the energization of said heating winding means, circuit connection means interconnecting said moisture-responsive means and said control means to operate said control means in accordance with said moisture-responsive means, said moisture-responsive means operating said control means to increase the energization of said heating winding means upon a decrease in moisture below a predetermined value and to decrease the energization of said heating winding means upon an ncrease in moisture above said predetermined value.

2. A control for an electric blanket having heating winding means, moisture-responsive means positionable to be influenced by moisture entrapped under the blanket, current supply circuit means for energizing said heating winding means, control means interconnecting said current supply means and said heating winding means to control the energization of said heating winding means, circuit connection means interconnecting said moisture-responsive means and said control means to operate said control means in accordance with said moisture-responsive means, said moisture-responsive means operating said control means to increase the energization of said heating winding means upon a decrease in moisture below a predetermined value and to decrease the energization of said heating winding means upon an increase in moisture above said predetermined value, and means to vary said circuit connection means to thereby change the operation of the control means in response to the moisture-responsive means for varying the control of the energization of said heating winding means.

3. A control for an electric blanket having heating winding means, moisture-responsive circuit mtans positionable to be influenced by moisture entrapped under the blanket, said moisture-responsive circuit means passing control current in response to moisture entrapped under the blanket, said control current increasing in value with increasing moisture, current supply circuit means for energizing said heating winding means, control means interconnecting said current supply means and said heating winding means to control the energization of said heating winding means, circuit connection means interconnecting said moisture-responsive circuit means and said control means to operate said control means in accordance with said control current passed by said moisture-responsive circuit means, said moisture-responsive circuit means operating said control means to increase the energization of said heating winding means upon a decrease in moisture below a predetermined value and to decrease the energization of said heating winding means upon an increase in moisture above said predetermined value.

4. A control for an electric blanket having heating winding means, moisture-responsive circuit means positionable to be influenced by moisture entrapped under the blanket, said moisture-responsive circuit means passing control current in response to moisture entrapped under the blanket, said control current increasing in value with increasing moisture, current supply circuit means for energizing said heating winding means, control means interconnecting said current supply means and said heating winding means to control the energization of said heating winding means, circuit connection means interconnecting said moisture-responsive circuit means and said control means to operate said control means in accordance with said control current passed by said moisture-responsive circuit means, said moisture-responsive circuit means operating said control means to increase the energization of said heating winding means upon a decrease in moisture below a predetermined value and to decrease the energization of said heating winding means upon an increase in moisture above said predetermined value, and means to vary said circuit connection means to thereby change the operation of the control means in response to the moisture-responsive circuit means for varying the control of the energization of said heating winding means.

5. A control for an electric blanket having heating winding means, moisture-responsive circuit means positionable to be influenced by moisture entrapped under the blanket, said moisture-responsive circuit means passing control current in response to moisture entrapped under the blanket, said control current increasing in value with increasing moisture, current supply circuit means for energizing said heating winding means, control relay means interconnecting said current supply means and said heating winding means to control the energization of said heating winding means, circuit connection means interconnecting said moisture-responsive circuit means and said control relay means to operate said control relay means in accordance with said control current passed by said moisture-responsive circuit means, said moisture-responsive circuit means operating said control relay means to energize said heating winding means upon a decrease in moisture below a predetermined value and to de-energize said heating winding means upon an increase in moisture above said predetermined value.

References Cited in the file of this patent

UNITED STATES PATENTS

| | | |
|---|---|---|
| 1,708,073 | Allen | Apr. 9, 1929 |
| 2,234,858 | Brown et al. | Mar. 11, 1941 |
| 2,237,006 | Koller | Apr. 1, 1941 |
| 2,611,854 | McNairy | Sept. 23, 1952 |
| 2,870,306 | Ohlheiser | Jan. 20, 1959 |
| 2,897,331 | McFarlane et al. | July 28, 1959 |